(12) United States Patent
Yi et al.

(10) Patent No.: US 7,606,226 B2
(45) Date of Patent: Oct. 20, 2009

(54) MULTIMEDIA SERVICE PROVIDING METHOD AND RADIO MOBILE COMMUNICATION SYSTEM

(75) Inventors: Seung-June Yi, Seoul (KR); Young-Dae Lee, Gyunggi-Do (KR); So-Young Lee, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 918 days.

(21) Appl. No.: 10/601,191

(22) Filed: Jun. 23, 2003

(65) Prior Publication Data

US 2004/0057387 A1 Mar. 25, 2004

(30) Foreign Application Priority Data

Jun. 22, 2002 (KR) ........................ 10-2002-0035179

(51) Int. Cl.
*H04L 12/28* (2006.01)
(52) U.S. Cl. ........................ 370/390; 370/392
(58) Field of Classification Search ........................ None
See application file for complete search history.

(56) References Cited

U.S. PATENT DOCUMENTS

| | | | |
|---|---|---|---|
| 5,457,808 A | 10/1995 | Osawa et al. | |
| 5,459,725 A | 10/1995 | Bodner et al. | |
| 6,097,949 A | 8/2000 | Jung et al. | |
| 6,104,709 A | 8/2000 | Rinchiuso et al. | |
| 6,252,868 B1 | 6/2001 | Diachina et al. | |
| 6,252,874 B1 | 6/2001 | Lee | |
| 6,684,081 B2 * | 1/2004 | Sarkkinen et al. | 455/515 |
| 6,701,155 B2 | 3/2004 | Sarkkinen et al. | |
| 6,751,227 B1 | 6/2004 | Ahmavaara et al. | |
| 6,804,528 B1 * | 10/2004 | Laroia et al. | 455/503 |
| 6,839,348 B2 * | 1/2005 | Tang et al. | 370/390 |
| 6,839,565 B2 * | 1/2005 | Sarkkinen et al. | 455/503 |
| 6,965,579 B1 | 11/2005 | Shin | |
| 6,965,580 B1 * | 11/2005 | Takagi et al. | 370/312 |
| 7,415,046 B2 | 8/2006 | Beckmann, et al. | |
| 2001/0002757 A1 | 6/2001 | Honda et al. | |
| 2002/0080737 A1 | 6/2002 | Koo et al. | |

(Continued)

FOREIGN PATENT DOCUMENTS

DE 10107700 8/2002

(Continued)

OTHER PUBLICATIONS

"Digital cellular telecommunications system (Phase 2+)", ETSI Standards, European Telecommunications Standards Institute, Sophia-Antipo, FR, vol. 3-T2; SMG4, No. V740, Sep. 2000.

(Continued)

*Primary Examiner*—Michael J Moore, Jr.
(74) *Attorney, Agent, or Firm*—McKenna Long & Aldridge LLP (57) ABSTRACT

A multimedia broadcast/multicast service (MBMS) in a universal mobile telecommunications system (UMTS) includes a UTRAN that provides an MBMS service. The MBMS service-related information is exchanged between the UTRAN and a terminal or between nodes in the UTRAN by using an MBMS identification so that a user group receiving MBMS data or a data of a specific MBMS service can be identified.

27 Claims, 8 Drawing Sheets

U.S. PATENT DOCUMENTS

| | | |
|---|---|---|
| 2002/0124069 A1 | 9/2002 | Hatalkar |
| 2003/0016698 A1 | 1/2003 | Chang et al. |
| 2003/0157949 A1 | 8/2003 | Sarkkinen et al. |
| 2003/0194992 A1 | 10/2003 | Kim et al. |
| 2003/0207696 A1 | 11/2003 | Willenegger et al. |
| 2004/0017809 A1 | 1/2004 | Park |
| 2004/0022218 A1 | 2/2004 | Kim et al. |
| 2004/0057387 A1 | 3/2004 | Yi et al. |
| 2004/0081192 A1 | 4/2004 | Koulakiotis et al. |
| 2004/0152473 A1 | 8/2004 | Kuwano et al. |
| 2004/0184471 A1 | 9/2004 | Chuah et al. |
| 2005/0076369 A1 | 4/2005 | Cai et al. |
| 2005/0193309 A1 | 9/2005 | Grilli et al. |
| 2006/0019641 A1 | 1/2006 | Vayanos et al. |
| 2006/0156370 A1 | 7/2006 | Parantainen |
| 2006/0168504 A1 | 7/2006 | Meyer et al. |
| 2006/0209870 A1 | 9/2006 | Lee et al. |

FOREIGN PATENT DOCUMENTS

| | | |
|---|---|---|
| EP | 1 077 539 A1 | 2/2001 |
| EP | 1077539 A1 | 2/2001 |
| EP | 1148687 | 10/2001 |
| IN | 00548/KOLNP/2004 A | 3/2006 |
| IN | 00911/KOLNP/2004 A | 5/2006 |
| IN | 00546/KOLNP/2006 A | 8/2007 |
| JP | 05-219056 | 8/1993 |
| JP | 07-283782 | 10/1995 |
| JP | 09-270790 | 10/1997 |
| JP | 11-252009 | 9/1999 |
| JP | 2000-138676 | 5/2000 |
| JP | 2000-358267 | 12/2000 |
| JP | 2001-053675 | 2/2001 |
| JP | 2001-128205 | 5/2001 |
| JP | 2001-298407 | 10/2001 |
| JP | 2001-308856 | 11/2001 |
| JP | 2002-064878 | 2/2002 |
| JP | 2002-539490 | 11/2002 |
| JP | 2003-060699 | 2/2003 |
| JP | 2005-512273 | 4/2005 |
| KR | 1019988024467 | 7/1998 |
| KR | 1019990037501 | 5/1999 |
| KR | 100224852 | 7/1999 |
| KR | 19990053163 | 7/1999 |
| KR | 100249503 | 12/1999 |
| KR | 1020000032645 | 6/2000 |
| KR | 1020000037821 | 7/2000 |
| KR | 1020000047263 | 7/2000 |
| KR | 1020010026301 | 4/2001 |
| KR | 1020020009282 | 2/2002 |
| KR | 1020020019314 | 3/2002 |
| KR | 1020020079453 | 10/2002 |
| KR | 1020030029310 | 4/2003 |
| KR | 2003-0069365 A | 8/2003 |
| KR | 1020040064869 | 7/2004 |
| KR | 1020050014984 | 2/2005 |
| WO | WO 99/44313 | 9/1999 |
| WO | WO 00/54521 | 9/2000 |
| WO | WO 2001/05158 | 1/2001 |
| WO | WO 01/10146 | 2/2001 |
| WO | WO 02/33937 | 4/2002 |
| WO | WO 02/41531 | 5/2002 |
| WO | WO 03/098871 | 11/2003 |
| WO | WO 03/105353 | 12/2003 |
| WO | WO 2004/017540 | 2/2004 |
| WO | WO 2004/028041 | 4/2004 |
| WO | WO 2004/028042 | 4/2004 |
| WO | WO 2004/042964 | 5/2004 |
| WO | WO 2005/013914 | 2/2005 |
| WO | WO 2005/067194 | 7/2005 |

OTHER PUBLICATIONS

Harri Holma and Antti Toskala: "WCDMA for UMTS" WCDMA for UMTS: Radio Access for Third Generation Mobile Communications, Jun. 7, 2000, pp. 123-127.

"Multicasting in UMTS", Palat, S.K.; Weerasekera, I.N.; Casata, A., 3G Mobile Communication Technologies 2002 (Third International Conference on May 8-10, 2002, pp. 96-101.

LG Information & Communication, Ltd. Korea: "Definitions and Characteristics of Multicast Channels" TSG RAN Working Group 2 (Radio Layer 2 and Radio Layer 3), Mar. 8, 1999, -Mar. 11, 1999 XP002275698 Stockholm.

"$3^{rd}$ Generation Partnership Project, Technical Specification Group Services and System Aspects; Multimedia Broadcast/Multicast Service; Stagel (Release 5); 3GPP Organizational Partners, published Mar. 2002, 3GPP TS 22.146 V5.2.0".

Holma, Harri, et al., "WCDMA for UMTS" WCDMA for UMTS: Radio Access for Third Generation Mobile Communications, p. 75-77, 123-127 and 135-151, Jun. 7, 2000.

LG Information & Communications, Ltd. Korea "Definitions and Characteristics of Multicast Channels Document for: Proposal of Multicast Channels" TSG-RAN Working Group 2 (Radio layer 2 and Radio layer 3); TSGR2#2(99)076; (Mar. 8-11, 1999 in Stockholm).

$3^{rd}$ Generation Partnership Project ; Technical Specification Group Services and System Aspects; Multimedia Broadcast/Multicast Service (MBMS); Architecture and Functional Description (Release 6), 3GPP TS 23.246 V6.1.0, Dec. 2003.

"Some Considerations on the L2 Design of the RB Carrying MBMS (update)," Phillips, 10.2.1, TSG-RAN Working Group 2 (Radio Layer 2 and Radio Layer 3), TSGR2#37(03)2146, Budapost, Hungary, Aug. 25-29, 2003.

WCDMA Technology and System Design, by Harri Holma & Antti Toskala, published by Mechanical Industry Press, Jan. 31, 2002.

* cited by examiner

FIG.1
BACKGROUND ART

Iu Interface

MULTIMEDIA SERVICE PROVIDING METHOD AND RADIO MOBILE COMMUNICATION SYSTEM

This application claims the benefit of the Korean Application No. P2002-35179 filed on Jun. 22, 2002, which is hereby incorporated by reference for all purposes as if fully set forth herein.

BACKGROUND OF THE INVENTION

1. Field of the Invention

The present invention relates to a telecommunication system and, more particularly, to a multimedia broadcast/multicast service (MBMS) of a universal mobile telecommunications system (UMTS).

2. Discussion of the Related Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology.

It is noted that for the purpose of creating a specification for standardizing the UMTS, various organizations around the world including ETSI of Europe, the ARIB/TTC of Japan, the T1 of the United States and the TTA of Korea formed a Third Generation Partnership Project (3GPP). Many standard features of the UMTS are being adopted by 3GPP.

Figure 1:
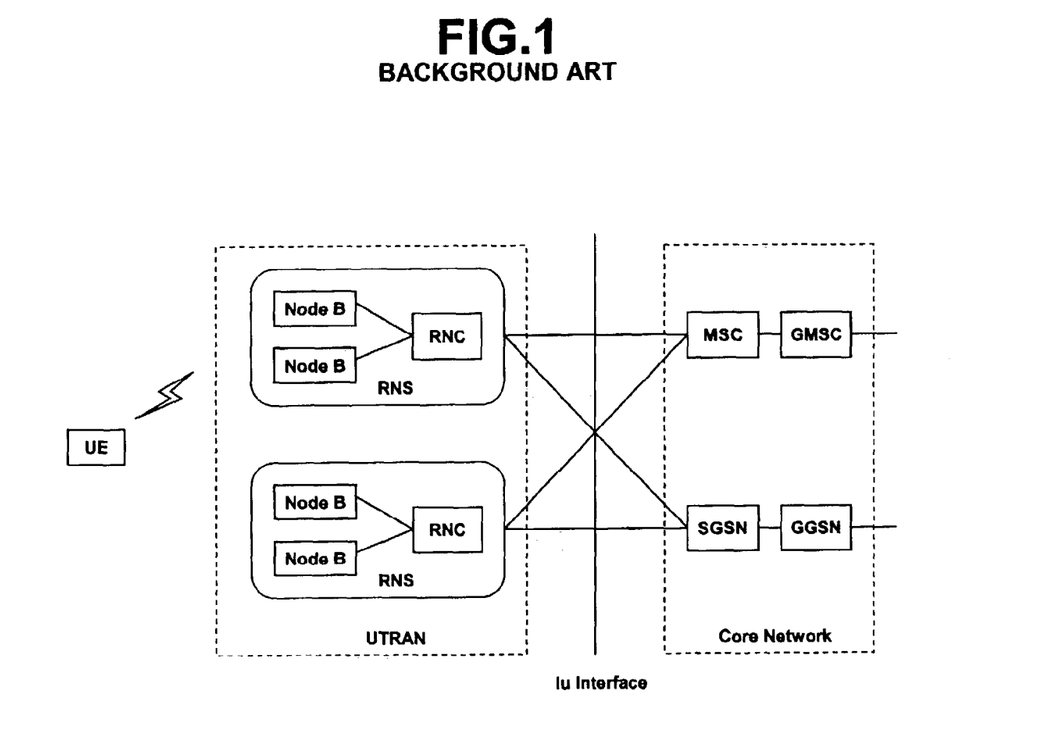
FIG. 1 illustrates a network structure of a general UMTS system.

FIG. 1 illustrates an example of the construction of a general UMTS network.

As shown in FIG. 1, a UMTS includes a terminal (UE), a UMTS terrestrial radio access network (UTRAN) and a core network. The UTRAN includes one or more radio network sub-systems (RNS). Each RNS includes one radio network controller (RNC) and one or more Node Bs managed by the RNC. Each Node B, managed by the RNC, receives information sent by the physical layer of the terminal through an uplink, and transmits data to the terminal (UE) through a downlink. Thus, Node B's operate as access points of the UTRAN for the terminal.

A primary function of the UTRAN is to constitute and maintain a radio access bearer (RAB) for a communication between the terminal and the core network. The core network applies requirements for a quality of service of an end-to-end to the RAB, and the RAB supports the QoS requirement the core network 130 sets.

Accordingly, by constituting and maintaining the RAB, the UTRAN can satisfy the QoS requirement of the end-to-end. The RAB service can be divided into lower Iu Bearer service and Radio Bearer service. The Iu Bearer service handles a reliable transmission of a user data in the boundary node between the UTRAN and the core network, while the radio bearer service handles a reliable transmission of a user data between the terminal and the UTRAN.

Figure 2:
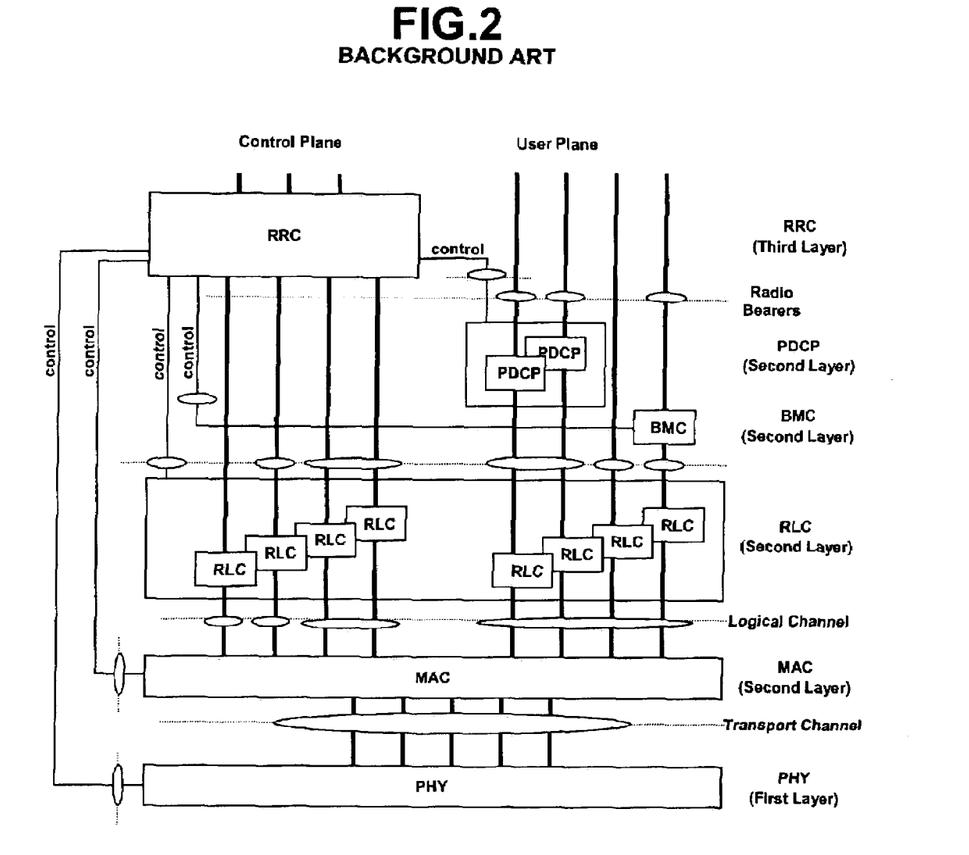
FIG. 2 illustrates a structure of a radio protocol between a terminal and UTRAN on the basis of a 3GPP radio access network standard.

FIG. 2 shows a structure of a radio protocol between a terminal which operates based on a 3GPP RAN specification and a UTRAN. The radio protocol is horizontally formed of a physical layer (PHY), a data link layer, and a network layer and is vertically divided into a control plane for transmitting a control information and a user plane for transmitting data information. The user plane is a region to which traffic information of a user such as voice or an IP packet is transmitted. The control plane is a region to which control information such as an interface of a network or maintenance and management of a call is transmitted.

In FIG. 2, protocol layers can be divided into a first layer (L1), a second layer (L2), and a third layer (L3) based on three lower layers of an open system interconnection (OSI) standard model well known in a communication system. Each layer of FIG. 2 will now be described.

The first layer (L1) provides information transfer service to an upper layer by using various radio transmission techniques. It is connected to an MAC (Medium Access Control) layer at the upper position through a transport channel, and data between the MAC layer and a physical layer are moved through the transport channel.

The MAC provides assignment service of an MAC parameter for assigning and re-assigning a radio resource. It is connected to a radio link control layer, an upper layer, by a logical channel, and various logical channels are provided according to the kind of transmitted information. In general, when information of the control plane is transmitted, a control channel is used. When information of the user plane is transmitted, a traffic channel is used.

The MAC is classified into MAC-b sublayer, MAC-d sublayer and MAC-c/sh sublayer according to the type of transport channel it manages. The MAC-b sublayer manages a broadcast channel (BCH), a transport channel handling broadcast of system information. The MAC-c/sh sublayer manages a common or shared transport channel such as the FACH or a DSCH (Downlink Shared Channel) shared by multiple terminals.

In the UTRAN, the MAC-c/sh sublayer is positioned in the CRNC. Since the MAC-c/sh sublayer manages channels shared by every terminal in a cell, one MAC-c/sh sublayer exists in each cell. The MAC-d sublayer manages a dedicated channel (DCH), a dedicated transport channel for a specific terminal. Therefore, the MAC-d sublayer is positioned at the SRNC handling management of a corresponding terminal and one MAC-d sublayer exists in each terminal.

The RLC layer supports reliable data transmission and performs a function of segmentation and concatenation of RLC service data unit (SDU) coming down from an upper layer.

The RLC SDU delivered from the upper layer is adjusted in its size suitable for a processing capacity in the RLC layer, to which header information is added and transmitted as a protocol data unit form to the MAC layer. The RLC layer has an RLC buffer to store RLC SDU or PDUs coming down from the upper layer.

A broadcast/multicast control (BMC) layer schedules a cell broadcast (CB) message delivered from the core network and allows user equipments positioned in a specific cell to perform a broadcast function.

At the side of the UTRAN, the CB message delivered from the upper layer is added with information such as a message ID, a serial number or a coding scheme and transmitted as the BMC message form to the RLC layer, and transmitted to the MAC layer through the logical channel CTCH (Common Traffic Channel). The logical channel CTCH is mapped with the transport channel FACH and S-CCPCH.

A packet data convergence protocol (PDCP) layer is positioned at an upper side of the RLC layer and allows data to be transmitted through a network protocol such as an IPv4 or IPv6 to be effectively transmitted on the radio Interface with a relatively small bandwidth. For this purpose, the PDCP layer performs a function of reducing unnecessary control information, which is called a header compression, and RFC2507 and RFC3095, a header compression technique defined in an Internet standardization group called IETF (Internet Engineering Task Force). With these methods, because the header part is allowed to transmit only essential information, less control information is transmitted, thereby reducing a quantity of data to be transmitted.

The radio resource control (RRC) layer positioned in the lowest portion of the L3 is defined only in the control plane and controls the logical channels, the transport channels, and the physical channels in relation to the setup, the reconfiguration, and the release of the RBs. The RB is a service provided by the second layer for data transmission between the terminal and the UTRAN. Setting up the RB means processes of stipulating the characteristics of a protocol layer and a channel, which are required for providing a specific service, and setting the respective detailed parameters and operation methods.

The multimedia broadcast/multicast service (MBMS) will now be described.

The MBMS is a service transmitting multimedia data such as an audio, a video or an image to a plurality of terminals by using a uni-directional point-to-multipoint bearer service. UTRAN transmits the MBMS data over a downlink common transport channel such as FACH or DSCH in order to heighten an efficiency of a radio network.

The MBMS has two types of modes of a broadcast mode and a multicast mode. Namely, the MBMS service is divided into an MBMS broadcast service and an MBMS multicast service.

The MBMS broadcast mode is a service transmitting multimedia data to every user located in a broadcast area. The broadcast area herein refers to an area where a broadcast service is available. One or more broadcast areas can exist in one public land mobile network (PLMN), and one or more broadcast services can be provided in one broadcast area. Further, one broadcast service can be provided to several broadcast areas.

The MBMS multicast mode is a service for transmitting multimedia data only to a specific user group in a multicast area. Here, the multicast area refers to an area where a multicast service is available. There can exist one or more multicast areas in one PLMN, and one or more multicast services can be provided in one multicast area. Further, one multicast service can be provided to several multicast areas.

In the MBMS multicast mode, a user is required to join a multicast group for receiving a specific multicast service. Here, the multicast group refers to a user group receiving a specific multicast service, and joining herein refers to a behavior of joining to the multicast group for receiving the specific multicast service.

The radio network temporary identifier (RNTI) will now be described.

The RNTI is used as identification information of a terminal while connection is maintained between the terminal and the UTRAN, including S-RNTI, D-RNTI, C-RNTI and U-RNTI.

S-RNTI (Serving RNC RNTI) is assigned by an SRNC (Serving RNC) when a connection is set up between the terminal and the UTRAN, and used as base information for the SRNC to identify a terminal.

D-RNTI (Drift RNTI) is assigned by a DRNC (Drift RNC) when a handover occurs between radio network controllers according to a terminal's movement.

C-RNTI (Cell RNTI) is used as information to identify a terminal in an CRNC (Controlling RNC) and given a new C-RNTI value from the CRNC when a terminal enters a new cell.

U-RNTI (UTRAN RNTI) consists of an SRNC identity and an S-RNTI and provides absolute identification information of a terminal in case that identification information of an SRNC managing a terminal and identification information of a terminal in the corresponding terminal can not be recognized.

When data is transmitted by using a common transport channel, an MAC-c/sh layer includes C-RNTI or U-RNTI in a header of an MAC PDU and transmits it. At this time, the header of the MAC PDU also includes a UE ID type indicator informing a type of the RNTI.

One or more physical channel S-CCPCH (Secondary Common Control Physical Channel) can be provided by a cell, so that a terminal desires to receive a transmission channel FACH (Forward Access Channel) or a PCH (Paging Channel), it first selects a mapped S-CCPCH channel. That is, the terminal selects a S-CCPCH channel to be received by itself by using the U-RNTI.

The conventional RNTIs are used only for the point-to-point radio service, they serve to identify only one terminal. Thus, when the terminal receives data through the downlink common transport channel, it recognizes whether the RNTI included in the header of the MAC PDU is the same as an RNTI assigned to itself and transfers only data including the same RNTI.

However, the MBMS transmitting data to a plurality of terminal, that is, to a terminal group, by using the point-to-multipoint radio service on the radio, the conventional RNTI can not be used.

First, when the conventional RNTI is used for the common transport channel for the MBMS, RNTIs of plural terminals for receiving a corresponding data should be all included in the header of the MAC PDU. Then, RNTIs as many as the receiving terminals are included in the header of the MAC PDU, the header becomes fat.

For this reason, in case of the conventional CBS service, no RNTI is included in the header of the MAC PDU to provide the point-to-multipoint radio service. Instead, a message ID is included in a BMC message in an BMC layer. In this case, however, the MAC layer of the terminal can not recognize whether a received data belongs to itself, every data received over the common transport channel should be transmitted to the upper RLC and BMC layers.

There is another disadvantage of the message identifier. In the conventional art, the user gives the BMC layer message identifier information to be received. The terminal thereby transfers a corresponding message to the upper layer only when a message identifier of the received BMC message is identical to a message identifier selected by the user. With this method, protection of information of a specific message data is not guaranteed. That is, because the whole message identifiers are known to the every user, it is not possible that a specific message data is received only by a specific user group or a specific message data is protected from damage or distortion.

The above references are incorporated by reference herein where appropriate for appropriate teachings of additional or alternative details, features and/or technical background.

SUMMARY OF THE INVENTION

Accordingly, the present invention is directed to a universal mobile telecommunication system that substantially obviates one or more problems due to limitations and disadvantages of the related art.

An advantage of the present invention is a multimedia service providing method in a radio mobile telecommunication system that provides an identification code for MBMS service.

Another advantage of the present invention is a universal mobile telecommunication system capable of determining whether a data is usable or not and transmitting only the usable data to an upper layer of a user equipment.

Still another advantage of the present invention is a universal mobile telecommunication system capable of assigning a radio resource, configuration and control information through an RNTI.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve at least the above objects in whole or in parts, there is provided a multimedia service providing method in an universal mobile telecommunication system in which multimedia broadcast/multicast service (MBMS) is provided to plural terminals, including: generating an identifier for a specific MBMS service; adding the generated identifier to every MBMS protocol data unit; and transferring the MBMS protocol data unit to a terminal.

Preferably, the identifier is an MBMS radio network temporary identifier (RNTI).

Preferably, the identifier is generated from a radio resource control (RRC) layer.

Preferably, the RRC layer generates the identifier when a radio access bearer is established, and discards the identifier when the radio access bearer is released.

Preferably, the identifier indicates a specific MBMS service or a multicast group.

Preferably, the specific MBMS service is a broadcast service or a multicast service.

Preferably, the identifier is included in header of an MBMS protocol data unit.

Preferably, the MBMS protocol data unit is an MAC protocol data unit and the header is a header of the MAC protocol data unit.

Preferably, the MBMS protocol data unit includes an indicator indicating a type of the identifier.

To achieve at least these advantages in whole or in parts, there is further provided a multimedia service providing method in an universal mobile telecommunication system in which multimedia broadcast/multicast service (MBMS) is provided to a terminal group consisting of plural terminals, including: generating an identifier for an MBMS service and assigning it to a terminal group; adding an MBMS identifier in the MBMS protocol data unit and transmitting it to the terminal group; and comparing the MBMS identifier contained in the received MBMS protocol data unit and the assigned MBMS identifier and receiving the MBMS protocol data unit by each terminal.

Preferably, the MBMS identifier is an MBMS radio network temporary identifier (RNTI).

Preferably, the MBMS identifier is generated by an RRC (Radio Resource Control) layer of UTRAN.

Preferably, the RRC layer generates the identifier when a radio access bearer is established, and discards the identifier when the radio access bearer is released.

Preferably, the MBMS identifier is assigned by an RRC (Radio Resource Control) layer of UTRAN.

Preferably, the MBMS identifier is assigned to the terminal group through an RRC message.

Preferably, the MBMS identifier is included in the header of the MBMS protocol data unit.

Preferably, the MBMS protocol data unit is an MAC protocol data unit and the header is a header of the MAC protocol data unit.

Preferably, the MBMS protocol data unit includes an identifier type indicator indicating a type of the identifier.

Preferably, the identifier type indicator is included in the header of the MBMS protocol data unit.

Preferably, the MBMS protocol data unit is an MAC protocol data unit and the header is a header of the MAC protocol data unit.

In the multimedia service providing method in an universal mobile telecommunication system of the present invention, the MBMS data receiving step includes: checking whether the MBMS identifier is included in the MBMS protocol data unit; checking whether the MBMS identifier included in the MBMS protocol data unit is identical to the previously assigned MBMS identifier if the MBMS identifier is included in the MBMS protocol data unit; removing a header from the MBMS protocol data unit if the two identifiers are identical; and transferring the header-removed MBMS protocol data unit to an upper layer of a terminal.

Preferably, the terminal checks whether the MBMS identifier is included in the MBMS protocol data unit by checking whether an identifier type indicator of the MBMS protocol data unit indicates the MBMS identifier.

Preferably, the identifier type indicator indicates a type of the identifier included in the MBMS protocol data unit.

Preferably, if the two identifiers are not identical, the terminal discards the received MBMS protocol data unit.

The multimedia service providing method of a universal mobile telecommunication system of the present invention further includes: constructing feedback information on the received MBMS data; and adding the MBMS identifier to feedback information of the MBMS data and transferring it to UTRAN by each terminal.

To achieve at least these advantages in whole or in parts, there is further provided a multimedia service providing method in an universal mobile telecommunication system in which multimedia broadcast/multicast service (MBMS) is provided to a terminal group consisting of plural terminals, including: transferring plural physical channel information to a terminal group; assigning an MBMS identifier to terminals which are to receive an MBMS data; and obtaining information of a specific physical channel indicated by the MBMS identifier from the plural physical channel information and receiving the MBMS data.

Preferably, the MBMS identifier is an MBMS radio network temporary identifier (RNTI).

Preferably, the MBMS identifier indicates the specific physical channel by indicating the number of the specific physical channel included in the plural physical channel information.

Preferably, the physical channel is a secondary common control physical channel transmitting MBMS data.

Preferably, information of the physical channel is a list of plural channels transmitting MBMS data and a parameter indicating a channel code of the physical channel, a scrambling code, a size of a data to be transmitted, a time interval at which data is transmitted, a channel coding, and a type of a transport channel mapped with a corresponding physical channel and a logical channel.

In the multimedia service providing method of a universal mobile telecommunication system of the present invention, the MBMS data receiving step includes: selecting a specific physical channel indicated by the MBMS identifier among the plural physical channels included in the plural physical channel information; obtaining information on the selected physical channel from the plural physical channel information; establishing the selected physical channel by each terminal; and receiving the MBMS data through the selected physical channel.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE PREFERRED EMBODIMENTS

Reference will now be made in detail to the embodiments of the present invention, examples of which are illustrated in the accompanying drawings. Wherever possible, the same reference numbers will be used throughout the drawings to refer to the same or like parts.

The present invention is implemented in such a mobile communication system as the UMTS (universal mobile telecommunications system), which has been recently developed by 3GPP. However, without being limited thereto, the present invention can be also applied to a communication system operated with different standards. Preferred embodiments of the present invention will now be described.

Applicants hereby incorporate by reference the publications which include the standard features that are both adopted and being proposed by 3GPP for all purposes as if fully set forth herein.

The present invention proposes an MBMS RNTI (MBMS Radio Network Temporary Identifier) used when MBMS service-related information is given and taken between UTRAN and a terminal or between nodes in UTRAN in case that UTRAN provides an MBMS service, in which the MBMS RNTI serves as a identifier for a specific MBMS service or a multicast group.

Characteristics of the MBMS RNTI

The MBMS RNTI is added as header information of an MBMS data transmitted to a user plane of a radio protocol. Especially, the MBMS RNTI can be included in an MAC header. For example, when MBMS data is transferred to a terminal through a downlink common transport channel such as FACH or DSCH, the MBMS RNTI is included in the MAC header so that the MAC layer that is responsible for MBMS can recognize whether the received MBMS data belongs to the MAC layer itself.

In both the broadcast mode and the multicast mode, MBMS RNTI is used as an identifier indicating a specific MBMS service provided in one RNS.

In the multicast mode, MBMS RNTI is also used as an identifier for indicating a group of users receiving a specific multicast service in one RNS. In other words, MBMS RNTI corresponds to an identifier indicating a set of users who receive a service from a specific RNS among users belonging to a multicast group.

MBMS RNTI is generated by the UTRAN when an MBMS RAB is set up for an MBMS service, and when the MBMS RAB is released, the MBMS RNTI is discarded. The MBMS RAB refers to a radio access bearer set for a specific MBMS service.

MBMS RNTI is managed by the CRNC, and an arbitrary MBMS RNTI is used to identify a specific MBMS service only in a pertinent CRNC.

MBMS RNTI is included in the MAC header of an MBMS data when the data is transmitted, for which the RRC layer of UTRAN informs the MAC-c/sh sub-layer of the UTRAN, the MAC sub-layer that is responsible for MBMS in the UTRAN, of an MBMS RNTI value for a specific MBMS service.

In addition, the RRC layer of UTRAN informs the RRC layer of a terminal of the MBMS RNTI value by using an RRC message. At this time, RRC layers of a plurality of terminals desired to receive the specific MBMS service are all assigned the MBMS RNTI value from the RRC layer of UTRAN.

Thereafter, the RRC layers of the terminals desired to receive the specific MBMS service informs the MAC-c/sh sub-layer, the MAC sub-layer that is responsible for MBMS in the terminal, of the received MBMS RNTI value.

Upon receiving the MBMS RNTI value from the RRC layer of UTRAN, the MAC-c/sh sub-layer of UTRAN stores the received MBMS RNTI value. Thereafter, the MAC-c/sh sublayer of UTRAN includes the stored MBMS RNTI value in a header of an MAC PDU for a corresponding MBMS service. At this time, an identifier type indicator indicating that a type of the RNTI is the MBMS RNTI is also included in the header of the MAC PDU. The identifier type indicator informs what kind of RNTI is included in a corresponding MAC PDU.

After receiving the MBMS RNTI value from the RRC layer of the terminal, the MAC-c/sh sub-layer of the terminal stores it. If the header of the received MAC PDU includes a terminal identifier type indicator, the MAC-c/sh sub-layer of the terminal recognizes what the terminal identifier type indicator indicates.

If the terminal identifier type indicator indicates MBMS RNTI, the MAC-c/sh sub-layer of the terminal compares MBMS RNTI stored in the MAC-c/sh sub-layer itself and MBMS RNTI included in the header of the received MAC PDU. If the two MBMS RNTI values are the same with each other, the MAC-c/sh sub-layer of the terminal transfers the corresponding data to the upper layer of the terminal.

Generation/Assignment/Discard Process of the MBMS RNTI

The following process is applied both to the broadcast mode and the multicast mode.

Figure 3:
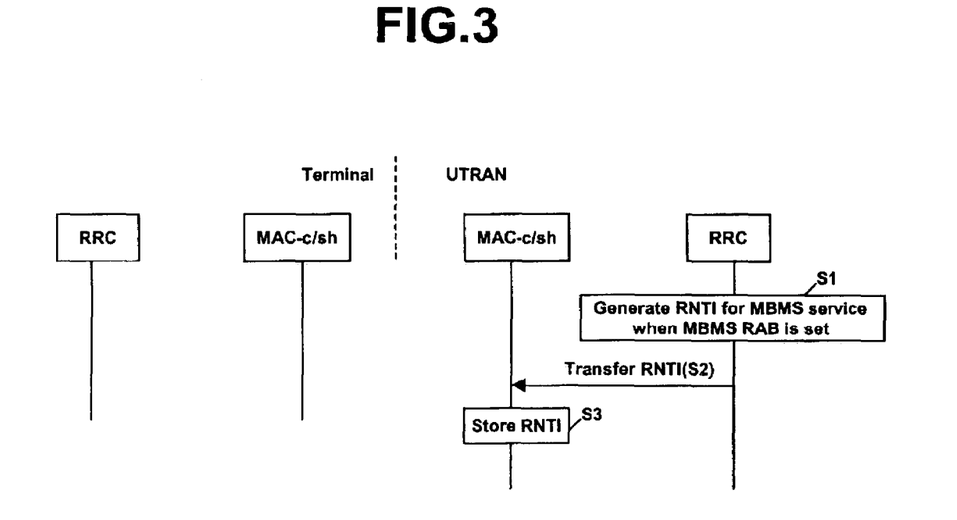
FIG. 3 is a signal flow chart showing a process of generating MBMS RNTI in UTRAN when an MBMS RAB is generated for an MBMS service in accordance with the present invention.

FIG. 3 shows a process of generating MBMS RNTI, in which UTRAN generates MBMS RNTI when MBMS RAB is generated for an arbitrary MBMS service.

Referring to FIG. 3, in case that MBMS RAB is generated for an MBMS service, UTRAN RRC generates MBMS RNTI for an MBMS service (S1), and transfers MBMS RNTI for the corresponding MBMS service to the UTRAN MAC-c/sh (S2). Thus, UTRAN MAC-c/sh stores the MBMS RNTI (S3).

Figure 4:
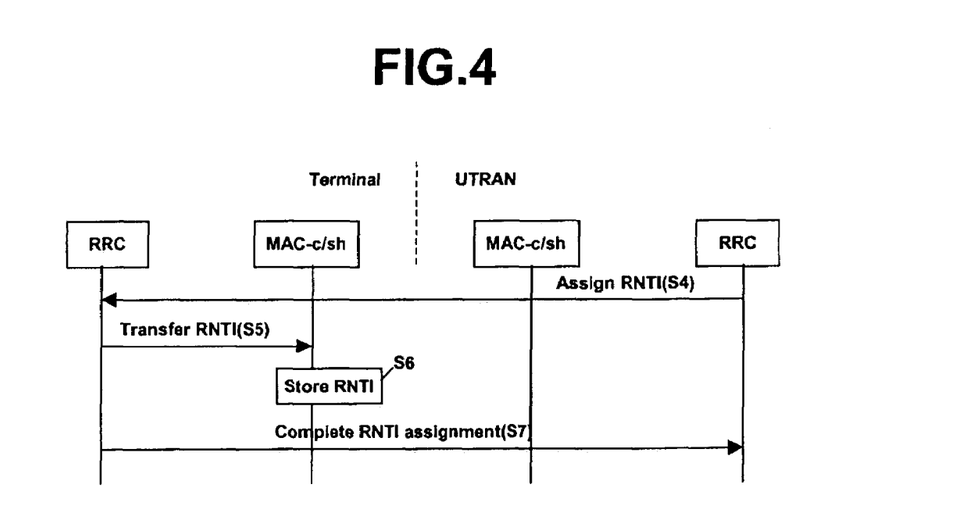
FIG. 4 is a signal flow chart showing a process of assigning MBMS RNTI to a terminal which is to receive an MBMS service after an MBMS RAB and an MBMS RNTI are generated in accordance with the present invention.

FIG. 4 shows a process of assigning MBMS RNTI to a terminal, in which after MBMS RAB and MBMS RNTI are generated, MBMS RNTI is assigned to a terminal for receiving a corresponding MBMS service.

As shown in FIG. 4, the UTRAN RRC transfers MBMS RNTI for an MBMS service to a terminal RRC through an RRC message (S4), the terminal RRC transfers MBMS RNTI to a terminal MAC-c/sh (S5). The terminal MAC-c/sh stores the MBMS RNTI (S6), and then the terminal RRC informs the UTRAN RRC that MBMS RNTI has been completely assigned through an RRC message (S7). Thereafter, the terminal can receive MBMS data for the corresponding MBMS service.

Figure 5:
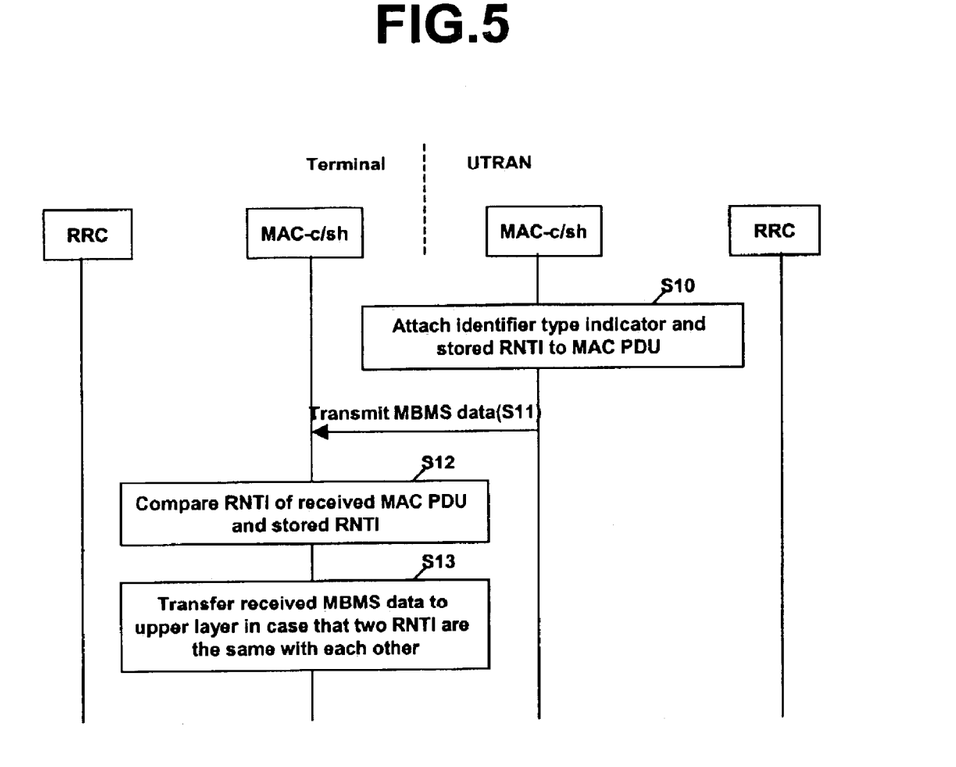
FIG. 5 is a signal flow chart showing a process of receiving a data of a corresponding MBMS service by a terminal which has been assigned the MBMS RNTI in accordance with the present invention.

FIG. 5 shows a process of transmitting MBMS data, in which a terminal assigned MBMS RNTI receives data of a corresponding MBMS service.

If an upper layer receives a data (MAC PDU) for a corresponding MBMS service, UTRAN MAC-c/sh includes an identifier type indicator and the stored MBMS RNTI in a header of a corresponding MAC PDU (S10). The identifier type indicator indicates that a type of included RNTI is MBMS RNTI. UTRAN MAC-c/sh transfers an MAC PDU to a terminal MAC-c/sh by using a service of a lower layer (S11).

If the identifier type indicator of a header of the MAC PDU received by the terminal MAC-c/sh indicates MBMS RNTI, the terminal MAC-c/sh compares MBMS RNTI of the received MAC PDU with the stored MBMS RNTI (S12). If the two RNTI values are the same with each other, the terminal MAC-c/sh removes the MAC header from the received MAC PDU, and then transfers the MBMS data included in the MAC PDU to an upper layer (S13).

Figure 6:
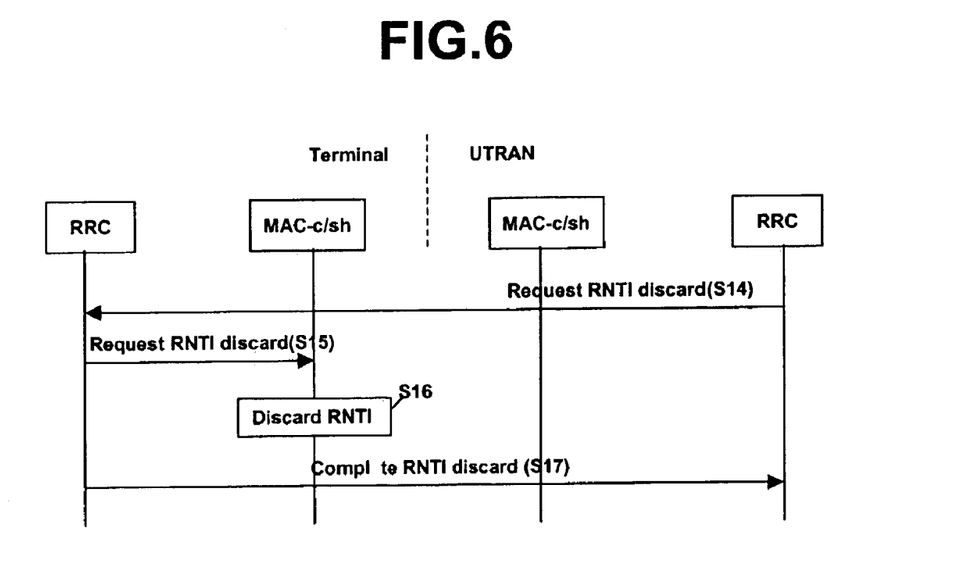
FIG. 6 is a signal flow chart showing a process of discarding the MBMS RNTI assigned to a terminal by UTRAN in accordance with the present invention.

FIG. 6 shows a process of discarding MBMS RNTI stored in a terminal, in which UTRAN discards MBMS RNTI which has been assigned to the terminal.

UTRAN RRC requests a terminal RRC through an RRC message to discard MBMS RNTI for a corresponding MBMS service (S14). The terminal RRC requests the terminal MAC-c/sh to discard MTMS RNTI according to the discard request (S15). The terminal MAC-c/sh discards the stored MBMS RNTI, and the terminal RRC informs the UTRAN RRC through an RRC message that the MBMS RNTI has been discarded (S17). Thereafter, the terminal can not receive MBMS data for the corresponding MBMS service.

Figure 7:
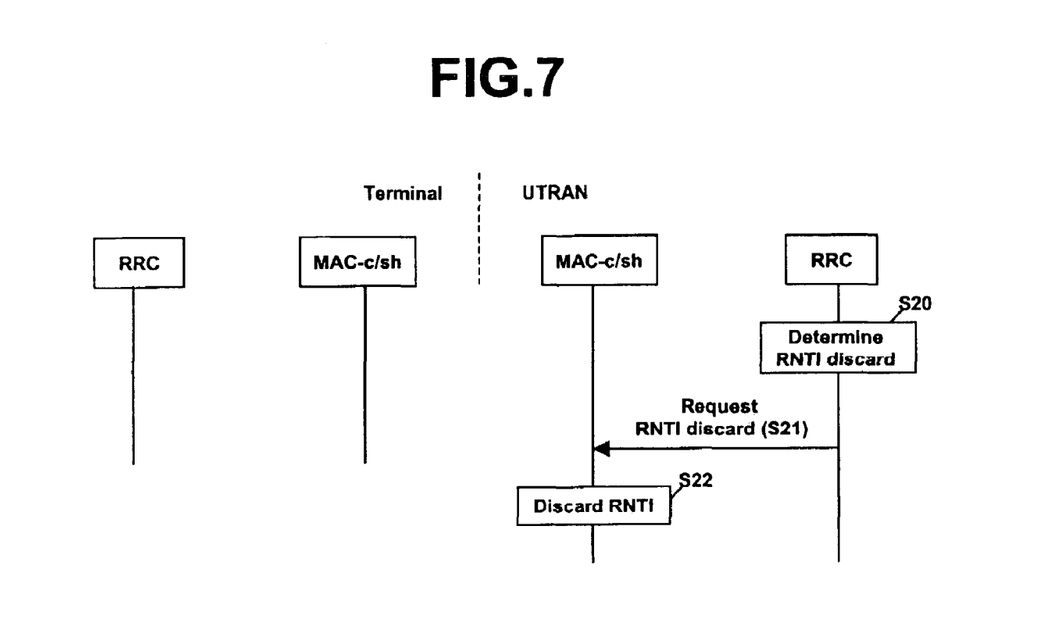
FIG. 7 is a signal flow chart showing a process of discarding the MBMS RNTI by UTRAN when the MBMS RAB for an MBMS service is discarded in accordance with the present invention.

FIG. 7 shows a process of discarding MBMS RNTI, in which UTRAN discards MBMS RNTI when MBMS RAB for an arbitrary MBMS service is discarded.

Figure 8:
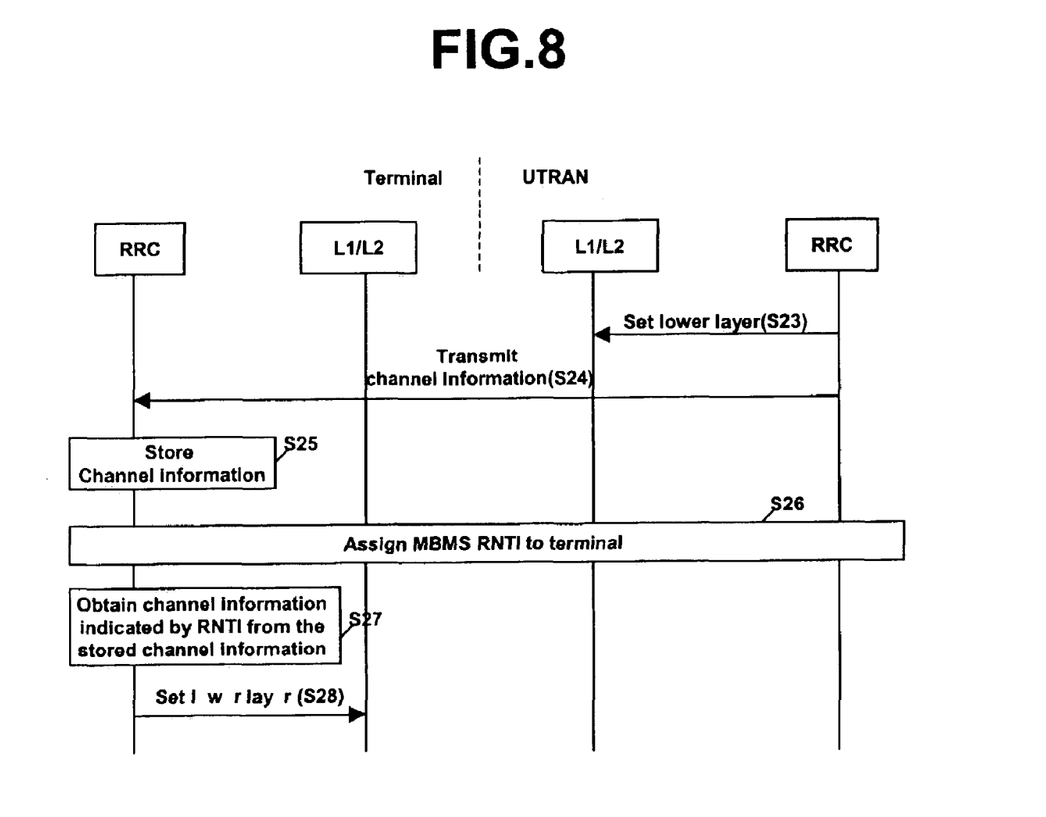
FIG. 8 is a signal flow chart showing a process of selecting a physical channel for receiving a data of a corresponding MBMS service by a terminal through allocation of MBMS RNTI in accordance with the present invention.

If there are one or more terminals storing corresponding MBMS RNTI, UTRAN can proceed with the process of FIG. 7 and the process of FIG. 8 together.

UTRAN RRC determines discard of MBMS RNTI for a corresponding MBMS service in case that MBMS RAB is released for an MBMS service (S20), and requests the UTRAN MAC-c/sh to discard MBMS RNTI for the corresponding MBMS service (S21). Thus, UTRAN MAC-c/sh discards the MBMS RNTI according to the RNTI discard request.

Radio Resource Assignment Through MBMS RNTI

MBMS RNTI performs a function of indicating a radio resource used for a specific MBMS service. UTRAN RRC informs the terminal RRC of channel information through system information of BCH. The channel information refers to a parameter such as the number of a physical channel being provided for service in a corresponding cell, a channel code of each physical channel, a scrambling code, a size of data to be transmitted, time interval for data transmission, a channel coding, a type of transport channel and a logical channel mapped with a corresponding physical channel, or the like.

In the present invention, a specific MBMS RNTI indicates the number of the physical channel transmitting a data of a specific MBMS service. By doing that, it is not necessary for UTRAN to transmit channel information for MBMS data transmission to corresponding terminals whenever MBMS RNTI is assigned.

In detail, when the MBMS service is transferred through the transport channel FACH and the physical channel S-CCPCH, UTRAN selects an S-CCPCH channel for transmitting a data of the corresponding MBMS service through the following equation (1):

$$\text{The number of S-CCPCH} = \text{MBMS RNTI modulo } K \quad (1)$$

wherein the value 'K' corresponds to the number of S-CCPCH with which FACH channel transmitting MBMS data in a corresponding cell is mapped and the number of S-CCPCH corresponds to a list order of S-CCPCH channels existing in system information of the corresponding cell.

The terminal can be aware of channel information corresponding to the number of S-CCPCH through the S-CCPCH channel list of the system information transferred through the BCH channel. Accordingly, the terminal calculates the number of S-CCPCH by substituting first assigned MBMS RNTI to equation (1) and obtains information of the calculated S-CCPCH channel from the system information, thereby receiving transmitted MBMS data.

FIG. 8 shows a process of allocating a physical channel through MTMS RNTI, in which a terminal selects a physical channel for receiving a data of a corresponding MBMS service through MBMS RNTI assignment.

UTRAN RRC sets up a lower layer for transmission of MBMS data (S23). That is, UTRAN RRC allows a physical layer, MAC, RLC and PDCP layer of UTRAN to set a parameter such as the number of the physical channel S-CCPCH provided for service in a corresponding cell, a channel code and a scrambling code of each physical channel, a size of a data to be transmitted, a time interval for data transmission, a channel coding and a type of transport channel and a logical channel mapped with a corresponding physical channel. Through this process, the physical S-CCPCH transmitting a MBMS data is set up.

UTRAN RRC transmits channel information to the RRC of a terminal through system information of BCH (S24). The channel information refers to the parameter such as the number of the physical channel provided for service in a corresponding cell, a channel code and a scrambling code of each physical channel, a size of a data to be transmitted, a time interval for data transmission, a channel coding and a type of transport channel and a logical channel mapped with a corresponding physical channel.

The terminal RRC stores the physical channel information (S25), and the UTRAN assigns MBMS RNTI to a corresponding terminal through the MBMS RNTI assignment process (S26).

The terminal RRC obtain information on the physical channel S-CCPCH indicated by the MBMS RNTI and a transport channel and a logical channel mapped with the channel form the physical channel information (S27). That is, the terminal RRC obtains the parameter such as a channel code and a scrambling code of the physical channel S-CCPCH transmitting a data of the specific MBMS service, a size of a data to be transmitted, a time interval for data transmission, a channel coding and a type of transport channel and a logical channel mapped with a corresponding physical channel.

The terminal RRC sets a lower layer of the terminal by using the obtained channel information (S28). That is, a physical layer, MAC, RLC and PDCP layer of the terminal are set by using the obtained channel information. Through this process, the physical S-CCPCH for receiving a data of the corresponding MBMS service is set. Then, the terminal can receive the data of the MBMS service through the transport channel FACH.

Transmission Control Information Using MBMS RNTI

The RRC layer of MBMS controls the transport channel and the physical channel with respect to set-up, re-set-up and release of RB to which MBMS RAB is mapped.

In order to control the set-up/re-set-up and termination, an RRC message is exchanged between RNC and UE. That is, MBMS RNTI is inserted into the RRC message for a specific MBMS service to identify a specific MBMS service.

For example, an RRC of a terminal which has received a data of a specific MBMS service transfers feedback information on an MBMS data to the RRC of UTRAN, MBMS RNTI for a corresponding MBMS service is included in the feedback information to identify the corresponding feedback information. That is, the specific MBMS RNTI is included in the RRC message transmitting the feedback information.

As so far described, the multimedia service providing method of universal mobile telecommunication system of the present invention has the following advantages.

That is, when UTRAN provides an MBMS service, MBMS RNTI is used to give and take MBMS service-related information between UTRAN and the terminal or between nodes in UTRAN. Therefore, not only does a user group receiving an MBMS data can be easily recognized but also a data of a specific MBMS service can be easily recognized.

In addition, when data is transmitted to a plurality of terminals, that is, to a terminal group, by using a point-to-multipoint radio service, specific groups receiving the data can be discernible. Thus, only MBMS data corresponding to a corresponding terminal can be transferred from the MAC layer to the upper layer.

Moreover, MBMS RNTI indicates plural terminals with one identification information, so that the length of a header can be reduced compared with the use of RNTI as in the conventional art.

Furthermore, the use of an identifier temporarily assigned in UTRAN obtains an effect of protecting information of MBMS data compared with the use of a fixed message identifier.

Also, because MBMS RNTI indicates a specific radio resource, a radio resource can be automatically assigned to plural terminals even without an assignment control message, and thus, complexity of scheduling of MBMS data transmission can be reduced.

There maybe many different types of services and a Service ID (or MTCH: MBMS Traffic Channel) corresponds to a service type. Thus, if there are 20 services, then there may be 20 Service ID's, for example. In this instance, the format of the MAC PDU may be [TCTF][MBMS-ID][MAC SDU], where "TCTF" is the Target Channel Type Field, "MBMS-ID" is the MBMS Identification code and "MAC SDU" is the MAC service data unit. In this instance, for example, the header contains [TCTF] and [MBMS-ID]. Although the header may have an extra field for the MBMS-ID, the MBMS-ID allows the MAC in the user equipment to filter those information that is unusable by identifying whether the specific MBMS-ID is in the list of those services that the particular user equipment is capable of receiving.

The MBMS-ID may be allocated and deallocated by the UTRAN or the core network. For example, the UTRAN or the core network may have a list of existing services. If a new service is needed or desired (either because the URAN or core network adds a new service or a new user equipment(s) enters a network that has the capability of receiving a new service that is not currently provided), then the UTRAN or the core network may include a new MBMS-ID in the list of services. Those user equipments that have the capability of receiving the new service represented by the new MBMS-ID will have the new MBMS-ID in its list of services capable of receiving at the MAC layer. If a service is no longer needed or desired (either because the URAN or core network deletes or cancels an existing service or an existing user equipment(s) leaves a network and the remaining user equipments do not need a particular service), then the UTRAN or the core network may delete the MBMS-ID(s) that corresponds to the service(s) that is no longer needed. Here, the MBMS-ID may be either a temporary ID (RNTI, for example) or a permanent ID.

Figure 9:
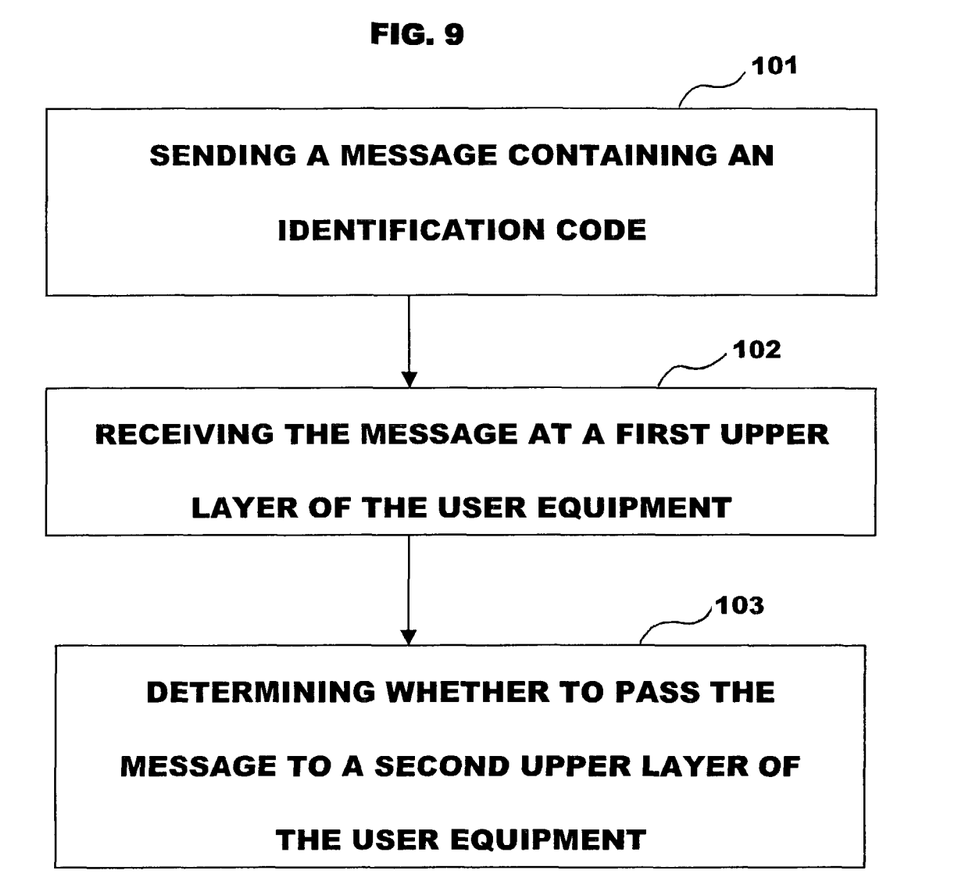
FIGS. 9-11 show flowcharts of the operation of the present invention.

FIG. 9 is a flow diagram showing a process of providing MBMS service in a mobile communication system according to an embodiment of the present invention. The communication system has a plurality of user equipments and a fixed station (such as the UTRAN and/or the core network), and it has a protocol including a physical layer and a plurality of upper layers above the physical layer.

Referring to FIG. 9, step 101 represents a fixed station sending a message (such as a broadcast or multicast message) to user equipments (UE) through the physical layer of the fixed station and the user equipments. The message is sent using a common channel or a dedicated logical channel, for example. The message contains an identification code corresponding to a specific MBMS service provided by the fixed station. This message may have a format including a header and data, and the identification code is contained in the header. The identification code may be a permanent code or temporary code. In a preferred embodiment, the fixed station may include multiple identification codes corresponding to multiple services available. In this case, for example, each identification code may correspond to a single specific MBMS service. In the present invention, a service corresponding to an identification code may be added or deleted by the fixed station. A service is added or deleted according to services required by the user equipment.

Then, in step 102, a first upper layer above the physical layer of the user equipment receives the message. The first upper layer may include a Medium Access Control (MAC)

layer, for example. In a preferred embodiment, the message has a MAC packet data unit format including a header having a message type and the identification code. The message type is a target channel type field (TCTF).

The first upper layer of the user equipment determines whether to pass the message to a second upper layer of the user equipment in step 103. The first upper layer uses the identification code to determine whether to pass the message to the second upper layer of the user equipment. A list of identification codes is received from an upper layer above the first layer.

Figure 10:
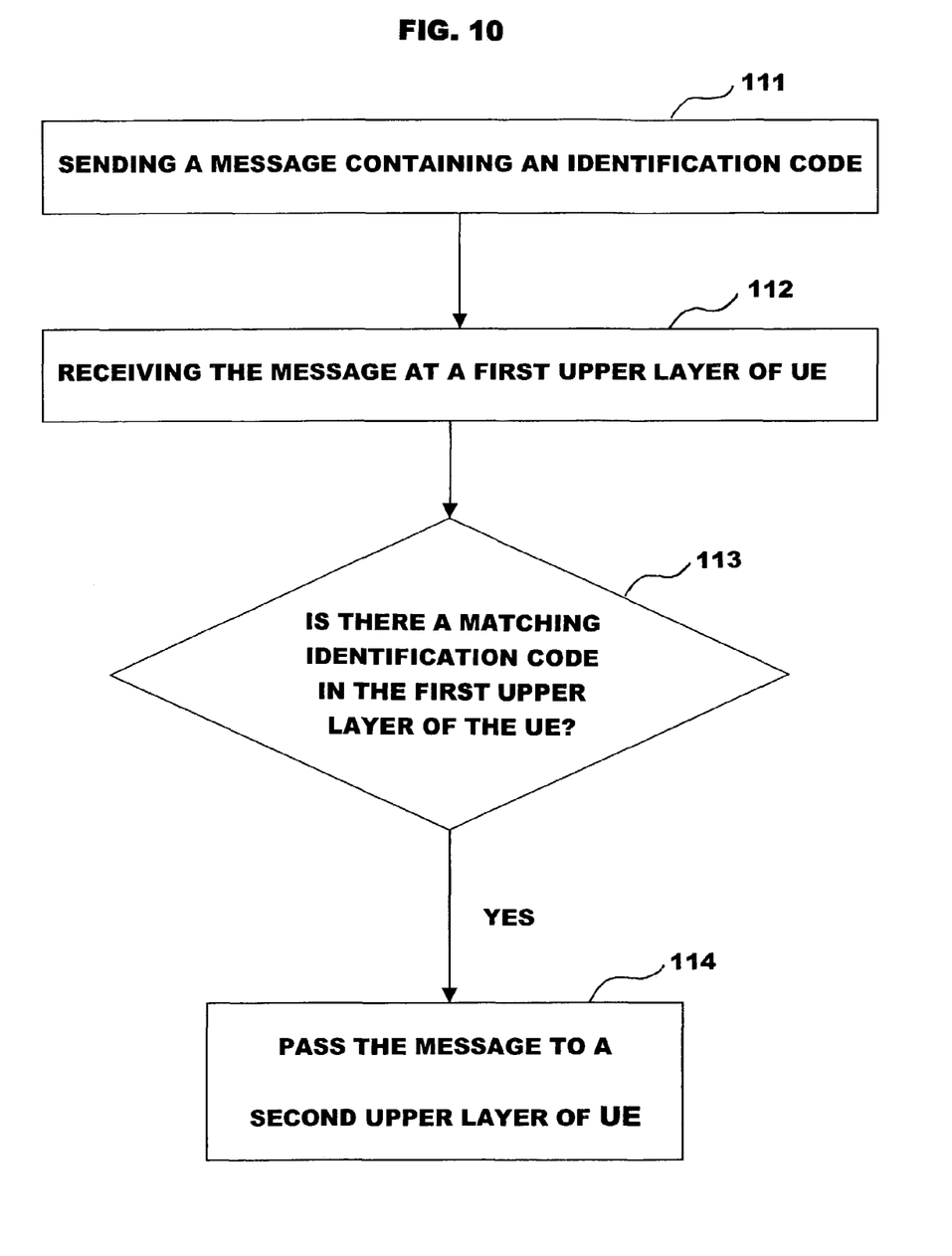

FIG. 10 is a flow diagram showing a process of providing MBMS service in a mobile communication system according to another preferred embodiment of the present invention.

Referring to FIG. 10, step 111 represents a fixed station sending a message to user equipments (UE) through the physical layer of the fixed station and the user equipments. In step 112, a first upper layer above the physical layer of a user equipment receives the message transmitted from the fixed station. Then, the user equipment compares the received identification code included in the received message with the identification code stored in its memory, for example, in step 113. If the received identification code matches an identification code in the memory of the user equipment, then the user equipment passes the message to a second upper layer, as shown in step 114.

Figure 11:
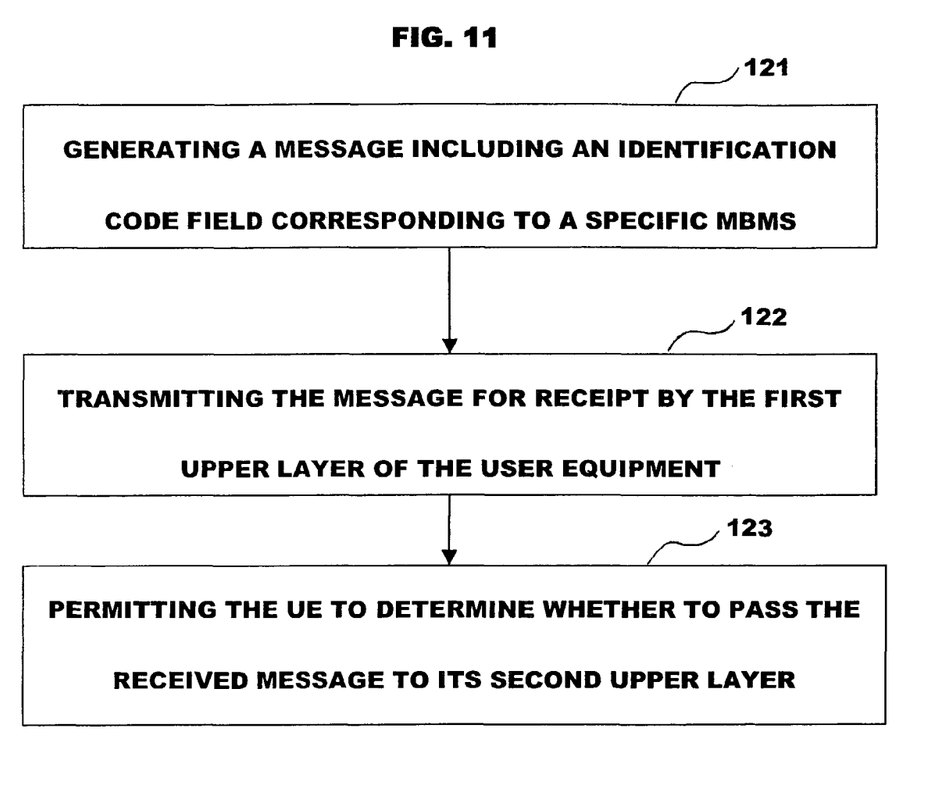

FIG. 11 is a flow diagram showing a process of providing MBMS service in a mobile communication system according to still another preferred embodiment of the present invention.

Referring to FIG. 11, step 121 represents a fixed station generating a message including identification code field corresponding to a specific MBMS. In step 122, the fixed station transmits the message via the physical layer for receipt by the first upper layer of the user equipment. Then, the first upper layer of the user equipment determines whether to pass the received message to its second upper layer in step 123.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of providing a point-to-multipoint service in a radio communication system, the method comprising:
    generating an identifier for indicating the point-to-multipoint service, wherein the identifier is configured by a radio resource control (RRC) layer;
    adding the generated identifier to a data unit which is for the point-to-multipoint service in a medium access control (MAC) layer, wherein the identifier is included in a header of the data unit; and
    transmitting the data unit to a mobile terminal via a Forward Access Channel (FACH) or a (Downlink Shared Channel) DSCH.

2. The method of claim 1, wherein the point-to-multipoint service is a multimedia broadcast/multicast service (MBMS).

3. The method of claim 1, wherein the identifier is a multimedia broadcast/multicast service (MBMS) radio network temporary identifier (RNTI).

4. The method of claim 1, wherein the identifier is generated from the radio resource control (RRC) layer.

5. The method of claim 4, wherein the RRC layer generates the identifier when a radio access bearer is established, and discards the identifier when the radio access bearer is released.

6. The method of claim 2, wherein the MBMS service is a multicast service.

7. The method of claim 1, wherein the data unit is a protocol data unit.

8. The method of claim 1, wherein the data unit includes an indicator indicating a type of the identifier.

9. The method of claim 1, wherein the identifier is managed by a controlling radio network controller (CRNC).

10. A method of receiving a point-to-multipoint service in a radio communications system, the method comprising:
    receiving a data unit including an identifier which indicates the point-to-multipoint service via a Forward Access Channel (FACH) or a (Down link Shared Channel) DSCH, wherein the identifier is included in a header of the data unit and the identifier was configured by a radio resource control (RRC) layer of a network;
    identifying the data unit is for the point-to-multipoint service in a medium access control (MAC) layer using the identifier; and
    transferring a point-to-multipoint service data of the data unit to an upper layer.

11. The method of claim 10, wherein the point-to-multipoint service is a multimedia broadcast/multicast service (MBMS).

12. The method of claim 10, wherein the identifier is a multimedia broadcast/multicast service (MBMS) radio network temporary identifier (RNTI).

13. The method of claim 10, wherein the identifier was generated from the radio resource control (RRC) layer in the network.

14. The method of claim 13, wherein the RRC layer generates the identifier when a radio access bearer is established, and discards the identifier when the radio access bearer is released.

15. The method of claim 11, wherein the MBMS service is a multicast service.

16. The method of claim 10, wherein the data unit is a protocol data unit.

17. The method of claim 10, wherein the data unit includes an indicator indicating a type of the identifier.

18. The method of claim 10, wherein the point-to-multipoint service data of the data unit to the upper layer is a header-removed data unit.

19. The method of claim 10, wherein the identifier is managed by a controlling radio network controller (CRNC).

20. The method of claim 1, wherein the configured identifier is transferred from the RRC layer to the MAC layer.

21. The method of claim 10, wherein the configured identifier was transferred from a RRC layer of a mobile terminal to the MAC layer.

22. The method of claim 1, wherein the header includes a target channel type field (TCTF).

23. The method of claim 10, wherein the header includes a target channel type field (TCTF).

24. The method of claim 1, wherein the identifier is used to identify the point-to-multipoint service among a plurality of point-to-multipoint services.

25. The method of claim 1, wherein the identifier is configured by assigning the identifier by the RRC layer.

26. The method of claim 10, wherein the identifier was configured by assigning the identifier by the RRC layer of the network.

27. The method of claim 10, wherein the identifier is used to identify the point-to-multipoint service among a plurality of point-to-multipoint services.

* * * * *